US006403210B1

(12) United States Patent
Stuivinga et al.

(10) Patent No.: US 6,403,210 B1
(45) Date of Patent: Jun. 11, 2002

(54) METHOD FOR MANUFACTURING A COMPOSITE MATERIAL

(75) Inventors: Marianne Euphemia Corry Stuivinga, Delft (NL); Amanda Margaretha Maas, Yokohama (JP); Erik Peter Carton, Delft (NL)

(73) Assignee: Nederlandse Organisatie voor toegepast-natuurwetenschappelijk Onderzoek TNO (NL)

( * ) Notice: Subject to any disclaimer, the term of this patent is extended or adjusted under 35 U.S.C. 154(b) by 0 days.

(21) Appl. No.: 09/422,493

(22) Filed: Oct. 21, 1999

Related U.S. Application Data

(63) Continuation-in-part of application No. 08/913,611, filed on Nov. 25, 1997, now Pat. No. 5,989,489.

(30) Foreign Application Priority Data

Mar. 7, 1995 (NL) ............................................. 9500455

(51) Int. Cl.⁷ ............................. B32B 5/14; B22F 1/02
(52) U.S. Cl. ................................ 428/307.7; 428/307.3; 428/313.9; 428/131; 419/6; 419/8; 419/27; 419/38; 419/63
(58) Field of Search .......................... 419/6, 8, 27, 38, 419/63; 428/307.3, 307.7, 313.9, 131

(56) References Cited

U.S. PATENT DOCUMENTS 4,879,262 A    11/1989  Halverson .................... 501/87
4,988,645 A  *  1/1991  Holt et al. .................... 501/91
5,683,797 A  * 11/1997  Carolan et al. ........... 428/307.3

FOREIGN PATENT DOCUMENTS

WO           9324216          12/1993

OTHER PUBLICATIONS

Derwent Publications Ltd., London, GB: AN 90–198830 XP002001709 & JP, A, 02 133 377 (Isuzu Ceramics Kenk.) May 22 1990.

R. Prümmer; Die Verdichtung von Keramik—und Metallpulvern sowie deren Mischungen durch Explosivedruck; der Berichte Deutschen Keramischen Gesellschaft vol. 50, 1974 pp. 75–81, Oct. 14, 1972.

* cited by examiner

Primary Examiner—Blaine Copenheaver
Assistant Examiner—Nai Vo
(74) Attorney, Agent, or Firm—Norris, McLaughlin & Marcus P.A.

(57) ABSTRACT

The invention relates to a composite material, manufactured by dynamic densification of an amount of granular or powdered relatively brittle material or a mixture of one or more of such materials, wherein a continuous porous product is obtained, whereafter, by infiltration thereof with a second material, the brittle material particles are embedded in a continuous network of the second material. The invention further relates to a composite comprising ceramic particles embedded in a continuous matrix of a second material, obtainable by a method according to the invention, and to products manufactured from such composite.

6 Claims, 11 Drawing Sheets

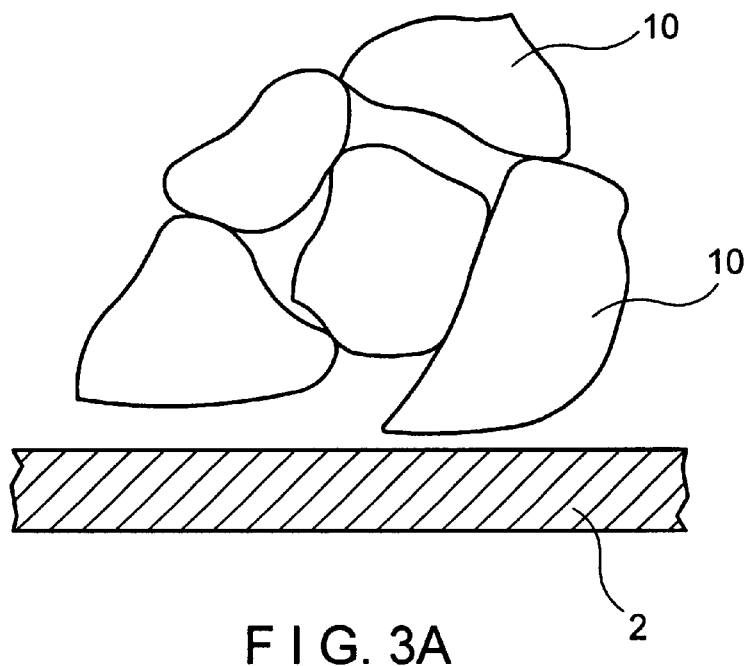
F I G. 3A
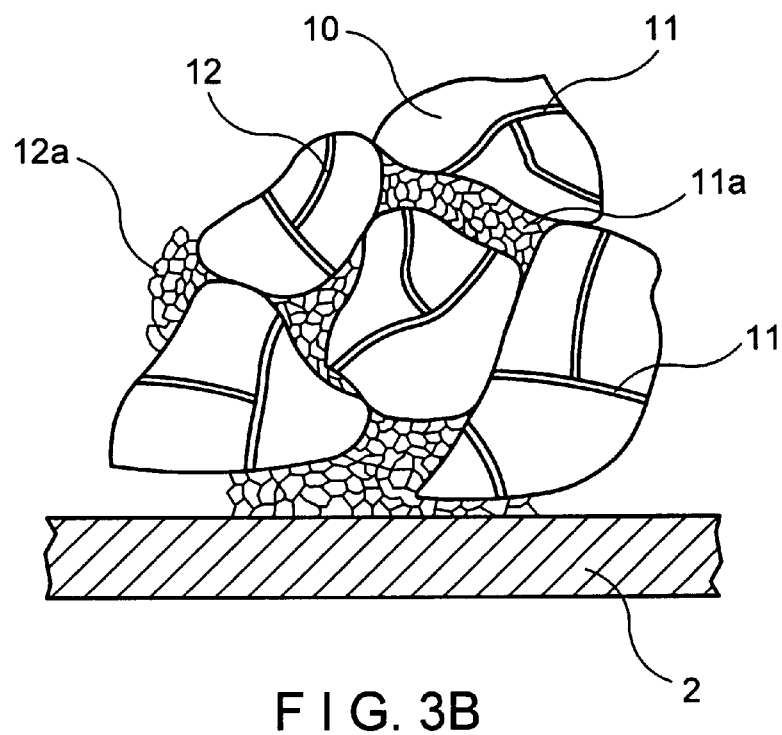
F I G. 3B

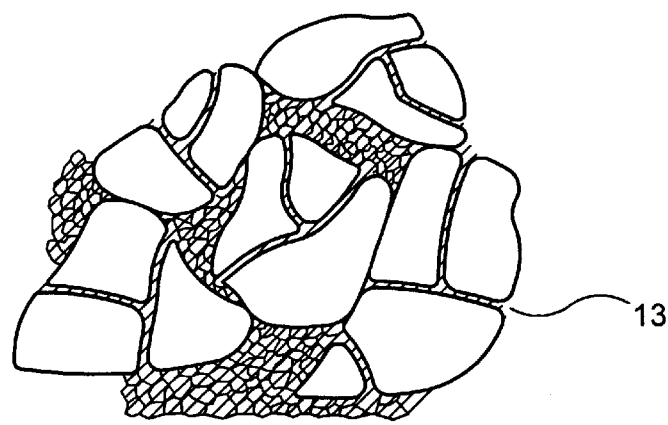
F I G. 3C
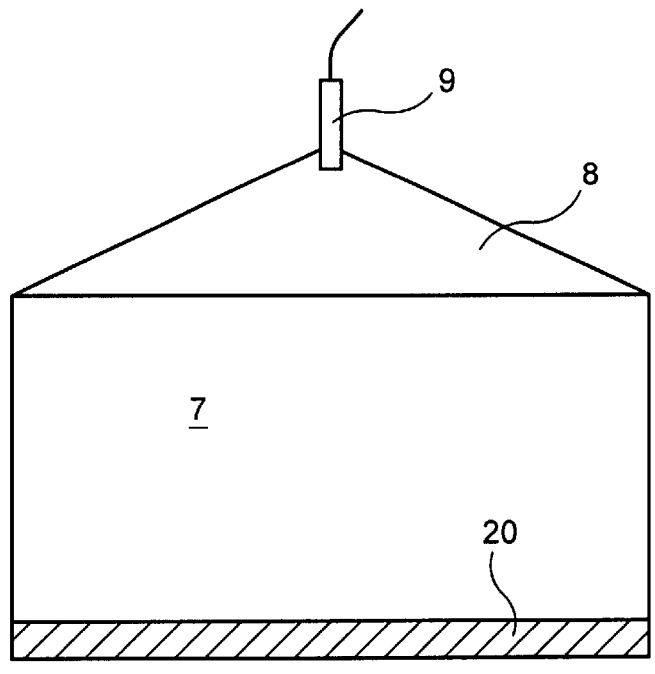
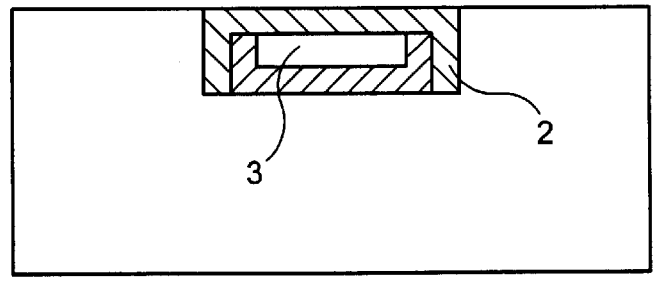
F I G. 4

METHOD FOR MANUFACTURING A COMPOSITE MATERIAL

BACKGROUND OF THE INVENTION

This application is a continuation-in-part of application Ser. No. 08/913,611 filed Nov. 25, 1997 now U.S. Pat. No. 5,989,489.

This invention relates to a method for manufacturing a composite material, in particular a ceramics or the like containing composite material, as well as to a composite material.

The use of ceramics in applications where conventionally metals were used has recently increased markedly. Reasons for this are, for instance, various clearly improved material properties, such as wear-resistance, hardness, corrosion-resistance, modulus of elasticity, dimensional stability, chemical resistance and heat-resistance. One of the important disadvantages of the use of ceramic materials, however, is that they are relatively brittle. Further, their resistance to thermal shocks is poor. Moreover, good ceramic composites are relatively expensive. As a consequence, the possible areas of application of ceramic composites are limited.

In order to avoid these disadvantages, a number of proposals have been made for the manufacture of such composites with improved properties.

European patent application 0,378,500 describes a method for manufacturing a metal-infiltrated composite material which comprises reaction products of the metal with boron and/or carbon. To that end, from a boron door material and a carbon donor material, a self-supporting intermediate of a relatively high porosity is formed, whereby bonds between the material particles are effected, for instance during sintering of the intermediate. Thereafter the intermediate is contacted with a molten parent metal, in a manner and for a time suitable to obtain a reactive infiltration. The space existing between the mutually bonded particles is thereby filled with the metal and the whole is maintained at a suitable temperature for a suitable time, in such a manner that at least chemical bonds are formed between boron and metal, carbon and metal and boron, and/or carbon and metal. As a result of the reactive infiltration, a composite material is formed with mutually bonded particles with residual metal between them.

In this method, bonds between the different particles are effected, partly prior to the infiltration. As a result, a base product with a relatively high density and relatively coarse particles is formed, whereby the product does not acquire a completely open porous network. Any closed porosity present in the product is not removed and therefore not filled with metal during the infiltration. The particles are not entirely surrounded by the metal, so that no fully continuous matrix is obtained in which the particles are embedded. Moreover, the properties of the starting materials change considerably as a result of the chemical reactions.

U.S. Pat. No. 4,879,262 describes a method for manufacturing composites and in particular boron-containing composites, using combustion synthesis of boride compounds and composites. To that end, a suitable mixture of at least a first, $B_4C$ rich component and a second, $B_4C/TiB_2$ rich component is composed and heated such that a maximum inclusion of the relatively light $B_4C$ into the relatively heavy $B_4C/TiB_2$ is obtained, whereafter a self-sustaining combustion is effected in the mixture, such that a densification of the matrix arises as a result of the chemical reaction. The densification is not maximal, so that a porous structure is left. Thereafter the porous composite obtained is infiltrated with liquid metal, for instance aluminum. As a result, a composite of a relatively high density is formed. It is noted that in this way other composites can also be obtained, provided a self-sustaining combustion front can be generated therein.

This method can only be used with specific combinations of starting materials, while moreover heating prior to the combustion is required in order to obtain a good densification. Further, a relatively coarse division of the particles is obtained, while the particles will frequently be in mutual abutment. Any porosity present, which may or may not have arisen during the reaction, is not prevented, reduced or removed in this known method. No completely open porous network is formed, so that the particles cannot be completely surrounded by the metal. Moreover, as a result of chemical reactions that occur, the properties of the starting materials change.

European patent application 0,207,371 describes a method for manufacturing composites, in which powders are dynamically densified to a very high relative density. The shock induced by an explosive and/or strike plate in this method should be so high that exothermic sintering of the powders occurs. Chemical bonds and possibly plastic bonds between the powder particles are thereby formed, so that a closed network is obtained of, for instance, metals, oxides and the like, and a substantially full density.

In this method a very strong shock should be induced, in such a manner that the starting powders enter into an exothermic chemical reaction. As a result, the composition, and hence the chemical and mechanical properties, of the mixture changes. Moreover, a continuous network of ceramic particles fixedly bonded to each other is obtained, which particles are therefore not embedded in another material which forms a continuous matrix. As a result, the material obtained does not have an optimum resistance to, for instance, thermal shocks and it is insufficiently tough. Moreover, only starting powders capable of entering into the desired exothermic reactions with each other can be used.

SUMMARY OF THE INVENTION

The object of the invention is to provide a method of the type described in the opening paragraph hereof, in which a relatively brittle, powdered material, preferably ceramic particles, in the composite are substantially, at least practically completely embedded in a matrix of a second material which through infiltration is introduced into a product formed by the relatively brittle material, with a completely open porous network. To that end, the method according to the invention is characterized by the steps of:

dynamically densifying an amount of granular or powdered relatively brittle material or a mixture of one or more of such materials;

whereby the material or mixture of materials is densified in such a manner that a continuous porous product is obtained; and infiltrating this with a second material, whereby after infiltration the brittle material particles are embedded in a continuous network of the second material.

In this description "dynamic densification", also referred to "explosive compaction" or "shock densification", is understood to mean: densifying a material using shock waves. For a review, reference is made to R. Prümmer, Ber. Dt. Keram. Ges.50, pp. 75–81, (1973).

By dynamically densifying the brittle material in accordance with the invention, a relatively highly dense product which has a fully open porous structure is obtained. That is to say, the particles are densely stacked without forming any fixed bonds between them. Thereafter, through infiltration, the porous network can be filled with a second material, for instance liquid metal or like material. Preferably, capillary infiltration is used. Owing to the product formed having an open porous continuous network, the particles can be entirely circumfused with metal. Thus a continuous matrix of the second material is obtained, in which the brittle particles are completely embedded, as a result of which the desired properties are obtained.

In a preferred embodiment, the method according to the invention is characterized in that the brittle material is predensified prior to the dynamic densification. Such predensification can occur in different ways, for instance by pressing the starting powders by using vibration techniques, by sludge densification and the like, or by combinations of different techniques. In some cases, pouring the brittle material into a die may already provide for a suitable predensification.

During the dynamic densification, in particular the pressure and the pulse duration that occur in the predensified product supply too little energy for bonds to form between the individual powder particles. On the other hand, a high powder density is obtained, of, for instance 80 to 90% of the theoretical maximum density (TMD). When in this description the term "density" is used the density based on the TMD is meant, unless stated otherwise. This high density is obtained although the (ceramic) starting material is brittle. During the dynamic densification, as a result of a shock wave passage, very high stresses arise at the points of contact of the different particles. As a result, a large part of the particles, and preferably substantially all particles, will break. In accordance with the invention, the subparticles thus formed will come to lie closer to each other, so that the density increases. Moreover, closed pores, if any, are opened as a result of the particles breaking and cracking. Thus a substantially completely open porous network of very finely divided channels is formed. In fact, as a result of the high stress concentration around closed pores, precisely the particles adjacent thereto will break first. Accordingly, during the dynamic densification, from powders with relatively large particles, a powder of a high density is obtained, consisting of very fine, irregularly shaped powder particles having between them a network of irregularly shaped, widely branched and continuous channels. The porosity is substantially entirely open.

By infiltration, the entire network of channels is filled with a second material. Preferably, this second material is relatively tough with respect to the brittle material. By way of example, a metal such as aluminum is mentioned. As a result of the rupture of the particles during the dynamic densification, the relatively brittle (material) particles acquire a very large total surface that comes into contact with the second material. Since the channels fill up substantially completely with the second material, the particles cannot move apart without thereby transmitting forces to the binding, relatively tough, second material. As a result, the composite acquires a toughness that approximates the toughness of the binding material. Moreover, the binding, infiltrated material, in particular when metals are used, provides for a good thermal conductivity, so that the occurrence of high stress concentrations in the composite material during extreme heating and cooling is prevented. As a result, thermo-cracks, certainly on a macroscale, are prevented. This means that the composite material obtained is tough and has a high thermoshock-resistance.

Upon heating of the composite material to above the melting temperature of the infiltrated material, this infiltrant may partly egress from the channels and form drops on the heated surface of the composite material. Upon heating to above the boiling temperature, it will form a gaseous cushion thereon which will prevent further heating of the surface by conduction. As a result, the melting of the relatively brittle (material) particles themselves is counteracted.

Since the infiltrated material is located in relatively narrow, highly tortuous channels and fills them up entirely, it is largely retained in the channels in liquid condition as well, as a result of inter alia capillary attraction. Owing to the large surface area/volume ratio of the brittle material particles themselves, a strong, tough bond is formed between the powder particles by the infiltrated material. As a result, the composite thus obtained has a high tensile strength.

If as a second material a different material is used which, for instance, has a toughness comparable with the brittle material, such as another ceramic material or a plastic such as a monomer or oligomer which after infiltration is converted into a (co)polymer, then a composite is obtained with other, favorable properties, for instance extreme impact resistance in addition to a low weight and high density. In that case, the polymerization can preferably be initiated from the outside, for instance by light or heat. Thus, using the method according to the invention, a variety of composites with different properties can be formed, as desired.

Upon infiltration of the microstructure, the material of the infiltrant may react with the material of the microstructure. The reaction products, possibly together with parts of the material of the microstructure that are broken loose from the microstructure during infiltration, will be incorporated in the infiltrant material and may form part of the second material forming the continuous matrix.

Further advantageous embodiments of methods according to the invention are described in the description of the drawings.

The invention further relates to a composite material comprising ceramic and/or relatively brittle metal particles embedded in a continuous matrix of a second material, obtainable according to a method of the invention, and a product manufactured from such a composite material.

The composite material is distinguished from known composites in its microstructure, by the presence of a large number of brittle fracture surfaces separated from each other by narrow channels, jointly forming a fine-mesh network of narrow channels, of an average diameter of typically a few hundred nanometers. Preferably, the average diameter of the channels ranges from 100 to 1000 nm, more preferably from 100 to 500 nm. The microstructure, after shock-wave compaction, will preferably comprise substantially no closed porosity. The volume percent of ceramic or other brittle material is then between 95 and 50 and preferably between 90 and 70.

BRIEF DESCRIPTION OF THE DRAWINGS

To clarify the invention, a number of exemplary embodiments of the method and the product according to the invention are described with reference to the drawings, in which:

FIG. 3A schematically depicts the powdered material prior to dynamic densification;

FIG. 3B schematically depicts the powdered material after dynamic densification but before infiltration;

FIG. 3C schematically depicts the powdered material after dynamic densification and infiltration;

FIG. 4 shows a cross-sectional view of a second exemplary embodiment of an apparatus for dynamic densification for use in a method according to the invention;

DESCRIPTION OF THE PREFERRED EMBODIMENT

Figure 1:
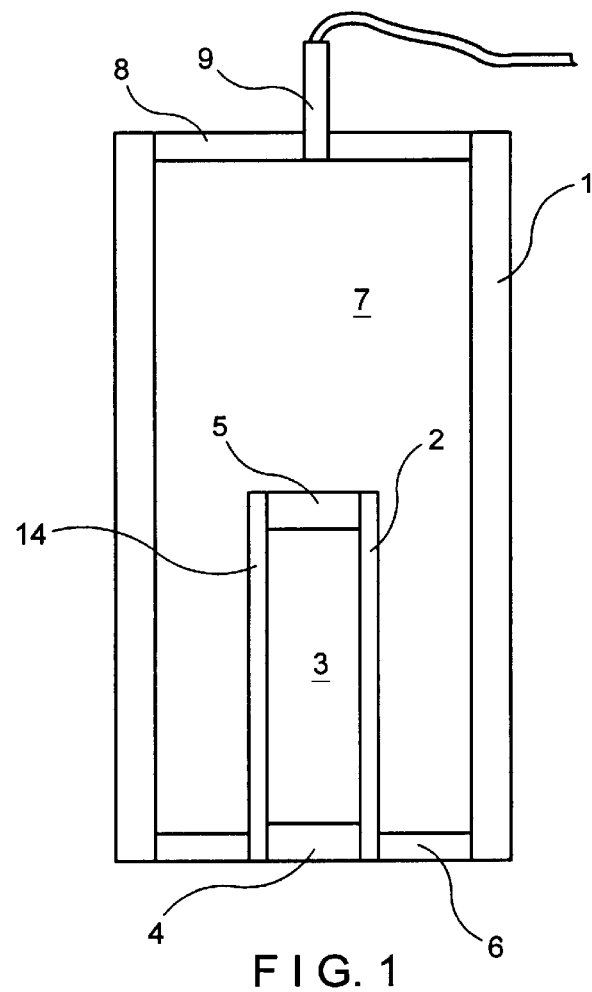
FIG. 1 is a cross-sectional view of a first exemplary embodiment of an apparatus for dynamic densification for use in a method according to the invention.

FIG. 1 shows an apparatus for dynamically densifying powders. This apparatus comprises an outer tube 1 and an inner tube 2 arranged concentrically therein. The inner tube 2 is filled with the powder 3 to be densified, for instance boron carbide or titanium diboride. The powder particles are relatively brittle with respect to the material of the inner tube 2, which, for instance, is made of aluminum or steel. The choice of the different materials will be further discussed hereinafter.

The inner tube 2 is closed at the bottom by a lower plug 4 and at the top by an upper plug 5. The inner tube 2 has been filled by first fitting the lower plug 4 and thereafter providing the powder 3 in a predensified form in the inner tube 2, layer by layer, for instance by vibrating and stamping. The predensification can, for instance, be between 50 and 70% TMD, but can also be greater or less, depending on the materials chosen and the desired properties. After the inner tube has been filled completely with the predensified powder 3, the upper plug 5 is arranged in position and the inner tube 2 is placed on the bottom of the outer tube 1, formed by a bottom plug 6. The outer tube 1 has a greater height than the inner tube 2.

Provided around the inner tube 2 and within the outer tube 1 is an amount of explosive 7 (suitable explosive materials are known to those skilled in the art, for instance explosives based on 81.2% ammonium nitrate (AN), 10% TNT and 8.8% Al (AMPA, 2, a blend manufactured at TNO-PML) and Triamite 80% AN, 19.8% TNT and 0.2% Al), sufficient to surround the entire inner tube 2, except for the underside. So a layer of explosive material 7 is disposed above the upper plug 5 as well. After the outer tube 1 has been filled completely, it is closed with a lid 8 in which detonation means 9 are included for the explosive material 7. The lid 8 is properly secured on the outer tube 1.

Figure 2:
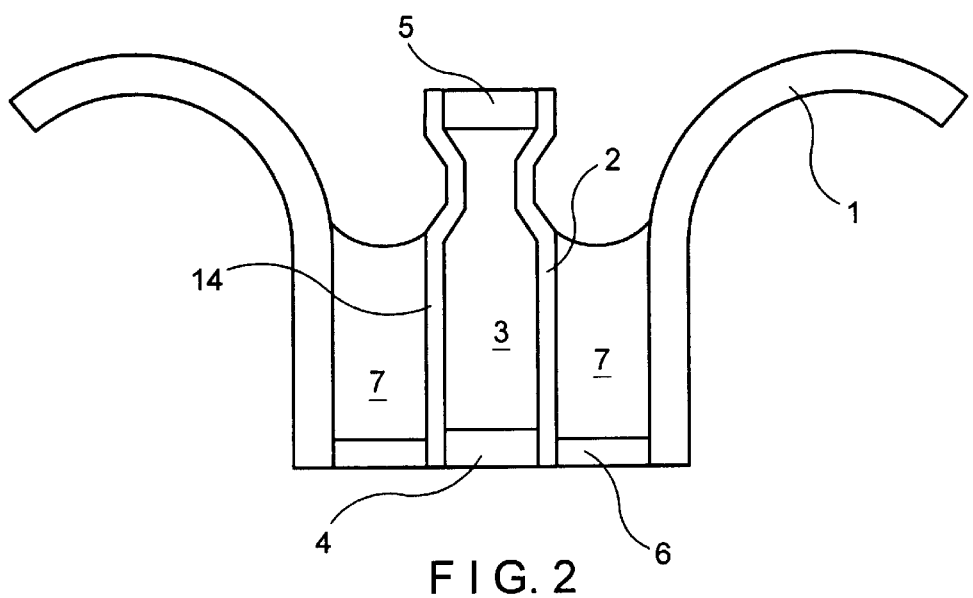
FIG. 2 is a cross-sectional view of the apparatus according to FIG. 1 after detonation, during dynamic densification.

When the detonation means 9 are energized and the explosive material 7 is caused to explode, a detonation wave is effected within the outer tube 1, which propagates from the top down and thereby generates shock waves in the inner tube 2 and the powder 3, which propagates inwards, as a result of which the inner tube 2 and the powder 3 are compressed and the powder is thus densified. In FIG. 2 this situation has already been achieved for the upper part of the inner tube 2. In the embodiment shown in FIG. 2, the outer tube 1 has been bent outwards during the dynamic densification, but when designed in a different material and/or a different shape, it can also remain intact. The inner tube 2 can optionally be lost during the dynamic densification or be subsequently removed mechanically or otherwise, but in a preferred embodiment is preserved around the powder for use during the subsequent infiltration step.

Owing to the fact that the shock wave front, the enveloping one of the inwardly moving shock waves, sometimes referred to as the shock wave, propagates substantially in radial direction in the inner tube 2 and the amount of powder 3 received therein, the energy that is supplied to each particle approximately remains equally large, since the loss of energy upon penetration into the powder is substantially compensated by the reduction of the cross-sectional area according as the wave front approaches the center of the inner tube 1. As a result, the energy per volume powder remains approximately the same over the entire cross-section of the inner tube 2 and the powder 3, so that an at least substantially uniform densification can be obtained.

The parameters of the shock wave to be induced by the explosion or otherwise, such as the pulse duration and pulse height, and the pressure to be generated, are chosen depending on at least the composition and nature of the powder to be densified, the desired densification and the product geometry, while at least a number of conditions should be met:

- The powder or mixture of powders consists at least partly of relatively brittle particles disposed loosely against each other, with the particles being preferably not spherical;
- Between the particles a wholly open porous network must be formed or preserved;
- During the dynamic densification, the particles are pressed closer to each other without bonds between the separate particles being thereby formed, neither in a chemical nor in a physical sense;
- At least a number of the brittle particles crack and/or break into smaller particles, whereby any closed porosity is eliminated and whereby a finely distributed system of very narrow channels is formed, which jointly form a continuous open porous network.

By way of illustration, in powders where for the formation of fixed bonds pressures of, for instance, some tens of GPa are required, in a method according to the invention a pressure of the order of, for instance, a few GPa is used. With hard ceramic powders, such a silicon carbide, boron carbide and titanium diboride, a suitable detonation pressure is between 2 and 4 GPa. For a tube diameter 2, for instance, with a diameter of 15 to 30 mm, a suitable explosive layer thickness, a measure for the pulse duration, is 0.5–2 times the tube diameter 2.

In the inner tube 2, prior to or during the provision of the powder 3 therein, one or more cores can be arranged, around which the powder is densified. The cores can be made of solid as well as hollow design and can have different compositions.

FIG. 3A schematically depicts the powder 3 prior to dynamic densification, optionally after pre-densification, and FIG. 3B schematically depicts the powder 3 after dynamic densification. Clearly visible are the microcracks and fracture surfaces, designated by 11 in FIG. 3B, which have been formed in the particles 10 as a result of the dynamic densification, and the grit 11a formed through the dynamic densification and collected between the particles 10. As a result, an entirely open porous network of channels 12 has been formed between the particles 10. A network of channels 12a has likewise been formed between and around the grit 11a produced.

After the dynamic densification of the powder 3 in the inner tube 2, the latter is taken from the outer tube 1 or the remains thereof and, as a whole or in parts, placed in a furnace or the like (not shown), in which the inner tube 2 with the powder is heated for a particular time, preferably under a shield gas, to above the melting temperature of the material of the inner tube 2 and/or the core. As a result, the material 14 of the inner tube 2 and/or the core liquefies and, as a result of flow behavior and capillary action, it will flow into the open porous network of channels 12 between the particles 10 and of the channels 12*a* around the grit 11*a*, so that the particles 10 and the grit 11*a* are entirely embedded in a matrix 13 of the material of the inner tube 2 and/or the core, as shown in FIG. 3C.

The wholly open porous network 12 and 12*a* is filled completely with the material 14 of the inner tube 2 and/or the core, with a very large contact surface being formed between the particles 10 and the filling material 14 referred to, since the particles 10 have become very small and have been broken brittle. Upon loading of the material formed, the particles cannot move apart without the matrix of the filling material 14 thereby absorbing at least tensile and pressure forces, even if the filling material 14 liquefies wholly or partly as a result of heating during use of the composite, since the particles are then retained by the filling material 14 as a result of the capillary attraction and the adhesion forces occurring. On the other hand, in liquid form too the filling material 14 is largely retained in the channels 12 as a result of the adhesion forces and the capillary attraction referred to. As a result, the composite material is tougher and stronger than known composites which have been formed from particles of sizes comparable to the unbroken particles 10 originally present in the powders.

If prior to the dynamic densification a core has been included in the powder 3, this core can optionally be removed prior to the infiltration, but this core can also be used as melting core for the supply of at least a part of the material 14 to be infiltrated. When a plastic melting core is used, it disappears upon the passage of the shock wave as a result of a disintegration—in that case, however, a provision should be made, for instance in the plugs, to enable the gas thereby formed to escape. As a consequence, for instance partly hollow objects such as pieces of pipe can be manufactured, which have been infiltrated from the cavity, while an infiltration material can be supplied from the outer circumference as well, which may or may not be the same as the material of the core. By using, for instance, an aluminum core and a stainless steel inner tube 2, at a suitable infiltration temperature, the aluminum core will melt and provide for aluminum infiltration from the inside, while the stainless steel jacket remains unaffected. This jacket can optionally be removed after the infiltration. However, it is also possible for the jacket to remain present around the infiltrated material as a metal mounting, and for the product to be used as such as a tubular body. This embodiment is of importance in particular when boron carbide or titanium diboride is infiltrated with aluminum, because these products have a coefficient of expansion that is approximately the same as the coefficient of expansion of steel.

The infiltration of the network 12 and 12*a* with a filling material 14 can be carried out in many different ways, allowing different properties to be obtained in each case. Thus the capillary infiltration described can be used or, for instance, gas infiltration or reactive infiltration. Further, the filling material can be a substantially inert, relatively tough material, or, conversely, a material highly reactive with the ceramic material, which, for instance, provides for a matrix which has a brittleness corresponding with the brittleness of the ceramic material.

In the foregoing, it has been discussed that the infiltrating material 14 derives from the inner tube 2 or a core included in the powder 3. However, it is also possible to supply the infiltrating material in a different way, for instance by means of cubes or the like arranged on or around the densified powder 3, or by the direct supply of molten material. In doing so, additional gas pressure can be applied to cause the infiltration to proceed faster or to enable infiltration in case of insufficient wetting of the filling material. Moreover, for the purpose of, for instance, reactive infiltration, a gaseous material can be supplied. It is also possible to infiltrate filling material that reacts in the network with a gas being presented, which induces in situ formation of bonds between the gas and the filling material.

In general, the method according to the invention can be used for any relatively brittle powder material and combination of powder materials, for instance inorganic materials such as:

ceramic materials, such as brittle oxides, carbides, nitrides, borides, tellurides and silicides, diamond, graphite, (ceramic) glasses and hydroxyapatite;

intermetallic compounds, such as titanium aluminides, Ti—Al—Nb and Al—Li alloys and metallic glasses, which compounds often are so-called RSP powders (rapid solidified powders) which, by rapid chilling from the melting phase, have retained their often unique microcrystalline microdendritic or amorphous structure and are in a metastable phase;

and brittle metals, such as

W, Mo and Be.

Typically filling materials that can be used in this connection are, for instance, metals such as: Ag, Cu, Sn and Zn, Al, Zr, Ti, Si, which may or may not be in pure form, or with additions to cause the infiltration to proceed faster, such as Mg and Si with Al, Cr and Ti with Cu, intermetallic compounds such as Ti—Al compounds, organometal compounds and (ceramic) glasses. Moreover, it is possible to use additives, for instance so-called fillers, particles which may or may not be ceramic which are included in the starting powder in order to obtain particular properties such as plugs for crack formation. Additionally, the powder material can be admixed with so-called fillers, by which are meant reinforcements, for instance in the form of wires, fibers, if desired in woven form, whiskers, and plates, which can render the composite material even stronger or tougher. Whiskers are small fibers, mostly monocrystalline, with a diameter of a few hundredths of a micron to a few microns and a length of hundreds of microns. Thus they possess good mechanical properties, but are often considered a health hazard. Plates can replace them. Monocrystalline plates typically have a thickness of 1 to 10 microns and a width of 10 to 1,000 microns.

Examples of materials for wires are: W, with or without additions of SiC or $B_4C$, steel.

Examples of fiber materials: C, SiC, $Si_3N_4$, B, combinations of $Al_2O_3$, $B_2O_3$ and $SiO_2$ or metal fibers such as Fecralloy (Fe—Cr—Al—Si alloy).

They can also be used when chopped to pieces (chopped fibers).

Examples of whisker materials are:

SiC, $Al_2O_3$, $Si_3N_4$ and boron carbide, Ni.

Examples of materials for plates: SiC and $B_4C$, $ZrB_2$.

Further, as filling material, for instance plastic can be used, for instance a monomer or oligomer or a mixture thereof, which is allowed to polymerize after inclusion in the network. As a result, a particularly strong and light material is obtained which, for instance, is particularly suitable for armoring. Typical ceramic products that can be obtained by a method according to the invention can be distinguished according to their infiltration method:

capillary infiltration, where substantially no chemical reactions occur between the relatively brittle material and the filling material:

examples are (given a suitable temperature range):
B$_4$C—Al, TiB$_2$—Al, SiC—Si, TiB$_2$—Fe, diamond-Cu.

reactive infiltration

TiB$_2$—Fe, B$_4$C—Ti, Al$_2$O$_3$—CaO.Al$_2$O$_3$ and B$_4$C—Al
HfB$_2$—SiC—Al (Al is the filling material).

Here, the infiltration temperature range in the case of B$_4$C—Al is a higher one than in the foregoing case which is evidenced by the formation of aluminum borides, carbides and boron carbide compounds, which can improve the mechanical properties, such as hardness.

With particular combinations of loose materials and infiltration materials, optionally a chemical reaction can occur at the interface between the loose material particles and matrix material. Thus, with X-ray diffraction techniques it has been demonstrated that upon infiltration of B$_4$C with aluminum, to some extent Al$_4$BC and AlB$_2$ are formed.

In reactive infiltration, by the choice of the temperature and/or additions to the filling material, the mechanical and corrosive properties of the composite material can be further set, an example being the addition of Mo, Cr, Ni and Co to the Fe.

infiltration and oxidation, nitridation, in situ

Here, during the infiltration, reactions occur between metal and the gaseous phase presented, so that during infiltration for a large adjustable part the metal is converted into a reaction product. A well-known example is the so-called Lanxide process.

Examples of products that can be formed thus are:

SiC—Al$_2$O$_3$—Al composites (here Al is the filling material and Al$_2$O$_3$ the reaction product).

ZrC—ZrN—Zr compounds (here Zr is the filling material and ZrN the reaction product, nitrogen the gas).

By additions to the filling material, for instance Ni to the Al, a Ni-aluminum compound can (partly) take the place of the residual Al, so that the erosive and corrosive properties of the composite material can be further improved.

gas infiltration CVI (Chemical Vapor Infiltration)

Here, a reactive gas infiltrates the pores and forms a layer therein. An example is the formation of SiC from mixtures of silane and H$_2$. Examples are: composites of B$_4$C with C or SiC via gas infiltration.

Plastic fillings

By pyrolysis of, for instance, Si-containing organometal polymers, the pores can be filled up with ceramic materials such as SiC and Si$_3$N$_4$.

The above-mentioned example of an oligomer which is allowed to polymerize to a polymer after inclusion in the network is styrene.

These examples are not intended to be exhaustive and serve only to illustrate the possibilities which the method offers.

FIG. 4 gives and alternative embodiment of an apparatus for carrying out the dynamic densification, in which, by means of a so-called strike or flyer plate 20 or like means, a shock wave is effected in the powder 3 provided in a die, in order to arrive at the desired densification. With this apparatus, a substantially flat shock wave front is generated, but only relatively flat parts can be manufactured with it. In fact, upon the shock wave penetrating the powder 3, a great deal of energy is lost. As a result, the densification decreases with the distance to the contact surface between the powder 3 and the flyer plate 20. Furthermore, the densified product can be processed further to the desired composite material in the manners described above.

A composite material obtained according to the method is, for instance, particularly suitable as a cathode in aluminum reduction cells as used in the aluminum-processing industry, for instance in the form of aluminum-infiltrated titanium boride. Further, a method according to the invention is particularly suitable for manufacturing products which during use are exposed to high thermal shocks such as exhaust pieces for (rocket) engines, for instance aluminum-infiltrated boron carbide or titanium diboride, while during the dynamic densification a melting core is arranged in the inner tube 2, which leaves a passage clear after infiltration.

Aluminum-infiltrated boron carbide moreover has very great utility as material for the manufacture of neutron control rods. This material according to the invention does not have the undesired swelling behavior of the know boron carbide rods. Moreover, microcracking in nuclear reactors does not occur because the boron carbide particles have already been subjected to a breaking step. In this connection, reference is made to the article of Stoto et al. in J. Appl. Phys. 68 (1990) 3198–3206.

Materials according to the invention such as boron carbide and titanium diboride which have been circumfused with aluminum further lend themselves eminently for use as raw materials for molds and nozzles that are useful for molding fiber-reinforced plastics.

Finally, materials obtained according to the invention are very suitable for manufacturing parts of burners, in particular TiB$_2$—Al, and bearings, in particular B$_4$C—Al.

Using the method according to the invention, applicant has developed materials for use as jet pipe insert for rocket engines.

Two of the cermets (ceramic-metal composites) obtained according to the invention consist of aluminum-infiltrated tubes of shock-densified boron carbide (BORCAL) and titanium diboride (TIBAL).

Both can be regarded as an aluminum or aluminum-containing matrix (10–20% by volume) with a very high fraction (f) of ceramic particles. The physical properties of the cermets, such as hardness and density, are mainly determined by the ceramic material, whereas, for instance, thermal and electrical conduction are substantially governed by the aluminum matrix.

Without wishing to be bound by any theory, this last can be explained by the great difference in conductivity of the metal with respect to the ceramic material.

If the conduction of the matrix (k$_m$) is much greater than that of the dispersed phase (k$_d$) the following applies to the conduction of a composite (k$_c$):

$$k_m >> k_d;\ k_c = k_m(1-f)/(1+f/2)$$

Herein, for k, both the electrical conductivity and the thermal conductivity coefficient can be taken.

Since f in this case is about 0.85, and since the cermet can be regarded as a dispersed ceramic in a metal matrix, it can therefore be expected for the conduction of a composite that:

$$k_c = 0.1\ k_m$$

The requirement of k$_m$>>k$_d$ is approximately satisfied for both types of conduction. The conduction of aluminum is exceptionally high, so that with the above considered model the cermets are attributed good conductivity properties, lower than those of aluminum by only one order of magnitude. Two remarks are in order here.

The poor electrical conduction of the boron carbide in combination with the great tortuosity of the composite material and the formation of less well conductive phases (Al$_4$BC) and AlB$_2$ causes the electrical conduction of the BORCAL to be lower than that of the aluminum by two orders. By contrast, the thermal conduction of the titanium diboride is only four times less than that of the aluminum and it appears to be better describable with a parallel conduction model, which predicts a conduction of approximately 0.5 times that of the aluminum.

Even if the powder particles are considered as perfect spheres (diameter d) (least possible surface area/volume ratio), the total surface occupied by the particles of a powder per unit mass (the specific surface A), is still very large:

$$A=6/d\rho \text{ (with } \rho \text{ being the density)}$$

The starting powders, for instance trimodal mixtures, have an average particle size of 50 μm, the density of boron carbide (B$_4$C) and titanium diboride (TiB$_2$) is 2510 and 4500 kg/m$^3$, respectively, so that their specific surface is 0.05 and 0.03 m$^2$/g, respectively. The specific surface of the shock-densified powders has increased with respect to that of the starting material through rupture of particles during the dynamic densification (decrease of d). For that matter, depending on the shape, surface roughness and, if any is present, open porosity of the particles, the specific surface is much greater in reality. The TiB$_2$ starting powder, for instance, has a BET specific surface of 0.2–0.6 m$^2$/g, while the TIBAL and BORCAL composite material, measured with mercury porosimetry, yields a specific surface of 0.8–1 and 1–2 m$^2$/g, respectively.

In the cermets under consideration here, the pore volume is entirely filled up by aluminum, so that the very large specific particle surface is now in contact with the aluminum. The good thermal conduction combined with the large surface to which heat can be given off, leads to temperature changes in the composite proceeding homogeneously. No large temperature gradients arise, so that large thermostresses remain absent and the cermets have a good thermoshock-resistance.

Upon homogeneous heating of the cermets, the difference in the coefficients of expansion of aluminum and the ceramic leads to microscale stresses. These are relaxed by the formation and the running of dislocations (plastic deformation) through the aluminum at that point. Aluminum has a very low yield stress, which moreover decreases further with increasing temperature.

Upon achieving the melting temperature of aluminum ($T_m$=660° C.), the temperature increase upon heating is temporarily interrupted in that at this temperature the energy supplied is used for the phase transition (s–1).

The melting of aluminum is accompanied by a volume expansion and owing to the aluminum being present as a liquid now, it cannot adsorb any shear stresses and starts to flow. It flows through the pores of the densified powder and flows out at the free surface of the cermet, which leads to the appearance of many aluminum droplets at the surface. Upon further temperature increase, (a fraction of) aluminum flows out via the pores due to the greater coefficient of expansion of the liquid aluminum with respect to that of the ceramic.

In the L*-tests (in which the material is exposed to the outlet gases of a solid rocket fuel), the composite, in any case locally, attains the boiling point of aluminum ($T_k$= 2500° C.). As with the melting point, again a phase transition (1–g) is involved here, which causes a temperature plateau caused by the required evaporation energy.

The gaseous aluminum shields the surface of the cermet from the environment (the heat source, that is, the combustion products from the solid fuel), so that an insulating "gas cushion" is formed, which prevents further heating by conduction, comparable to an ablative thermal protection mechanism (TPS) or a drop on a hot plate. As long as liquid aluminum reaches the surface and evaporates there, it can provide an active TPS and thus protect the composite against any further rise of the temperature, whereby the ceramic might melt. For that matter, at these high temperatures the heat is transferred for a considerable part via radiation.

The structural integrity which the as yet uninfiltrated ceramic possesses after dynamic densification through mechanical interlocking of the particles is also maintained under the high temperature conditions. The presence of a liquid in the pores of the powder will promote this structural integrity, since it can absorb hydrostatic stresses. Leakage of liquid aluminum is prevented due to the viscosity thereof, the large surface of contact with the ceramic, the narrow channels and the high tortuosity of the pore structure, as well as by the formation of a thin oxidic protective layer, which prevents further outflow. As a result, the liquid metal can contribute to the mechanical properties of the cermets at high temperatures. In comparison with non-infiltrated shock-densified ceramic, the infiltrated liquid aluminum increases the tensile strength of the cermet. The tensile stress tends to increase the relative distance of the ceramic granules, which would create a vacuum in the aluminum-infiltrated ceramic. The liquid resists this tendency and can therefore be subjected to tensile strain.

The filling material 14 forms a continuous matrix 13. If the material is suitably chosen, this matrix 13 has a better thermal and electrical conductivity than the ceramic material. As a consequence, heat which is supplied to the material can be carried off better than with pure ceramic material. This means that for this reason too composite material according to the invention has a good resistance to thermal shocks and moreover can be simply designed to be electrically conductive. For that matter, by choosing a suitable filling material, a non-conductive or hardly conductive composite material can be obtained as well.

In illustration of methods according to the invention, a number of examples are presented, which should not be construed to be limitative, but serve only for a better understanding.

EXAMPLE 1

Formation of a rod of aluminum-infiltrated boron carbide.

Figure 5:
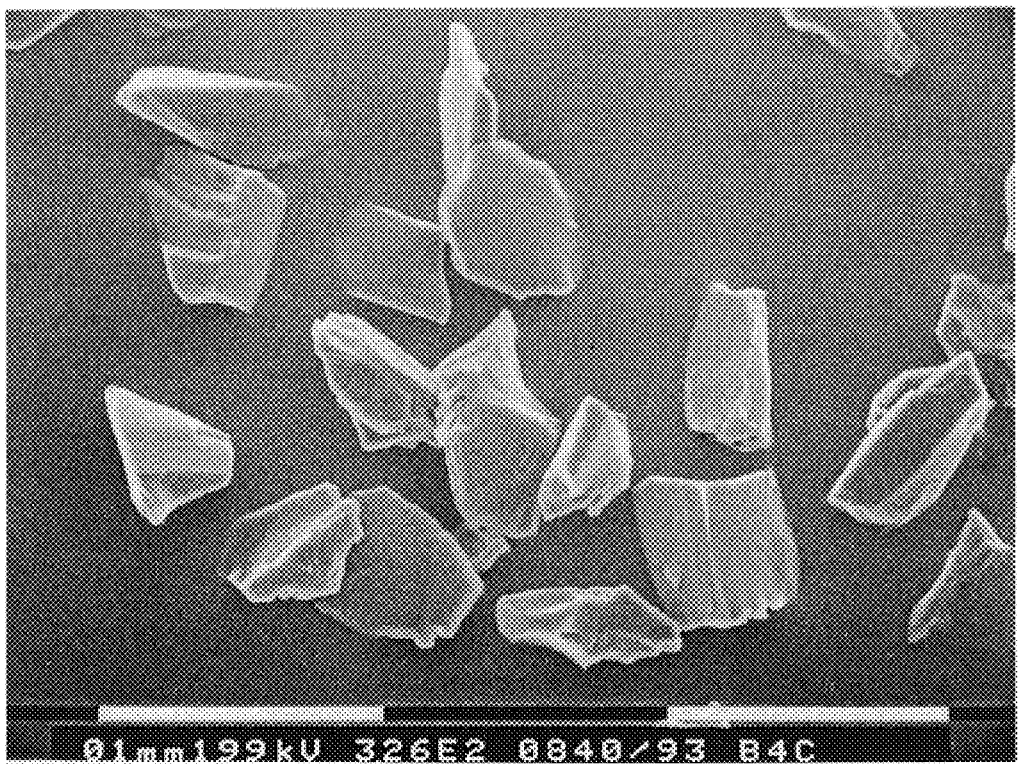
FIGS. 5–12 show cross-sectional views of composites manufactured via a method according to the invention and starting products therefor.

The starting material was a commercially available, angular boron carbide powder (Tetrabor from ESK) with an average grain size of approximately 50 μm. FIG. 5 shows an SEM (Scanning Electron Microscope) photograph of the starting powder.

By pressing layer by layer, the powder was introduced into an aluminum tube, whereby an initial density of 51% TMD was achieved. The powder was confined in the tube by means of an aluminum plug at the top an a PVC plug at the bottom.

Figure 6:
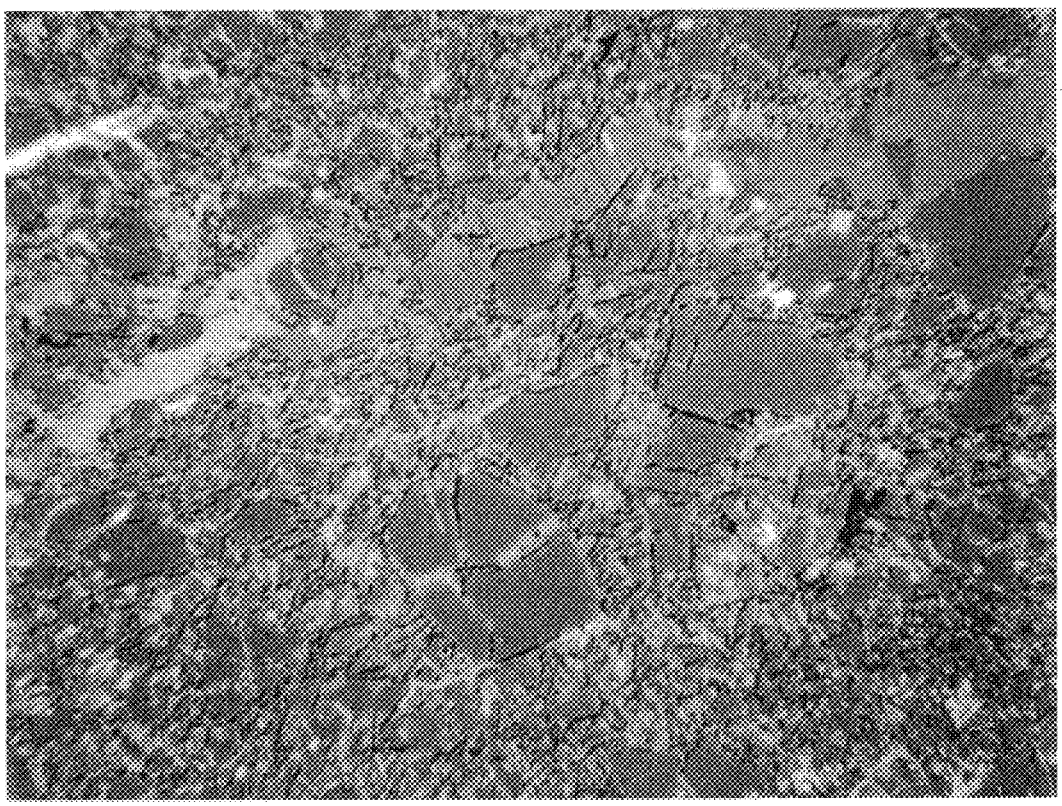

The aluminum tube was placed in the center of a larger plastic tube. The space between the two tubes was filled with the explosive AMPA 2 (a mixture of ammonium nitrate, TNT and Al) with a detonation velocity of 3.5 km/s and a detonation pressure of 3.2 GPa. By detonating the explosive with a detonator, the powder was densified to approximately 85% TMD. After this dynamic densification, the tube was sawn into disc-shaped pieces. These were placed in an electric furnace tube. Under N$_2$ shield gas, the furnace was heated to 925° C. in 1 hour and thereafter maintained at this temperature for 5 hours, whereafter the furnace was switched off. After capillary infiltration with aluminum (melting point of aluminum is 660° C.), a fully dense material was formed, comprising boron carbide particles embedded in a continuous matrix of aluminum. FIG. 6 represents a microscopic photograph of the composite material obtained.

Figure 7:
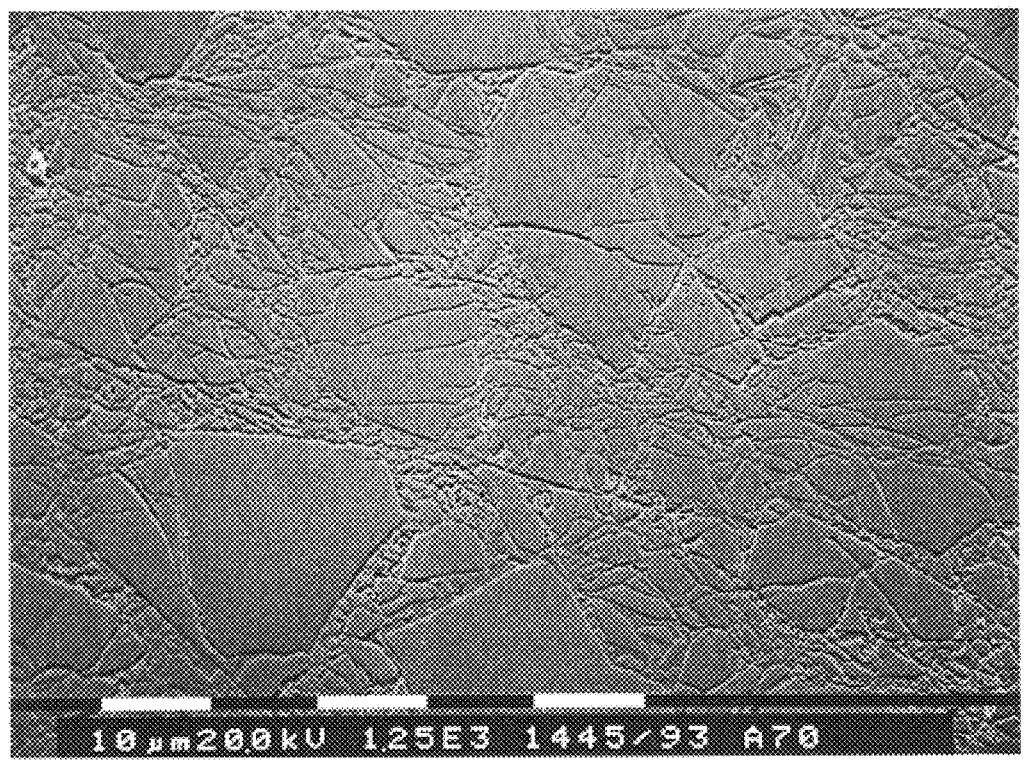
Figure 8:
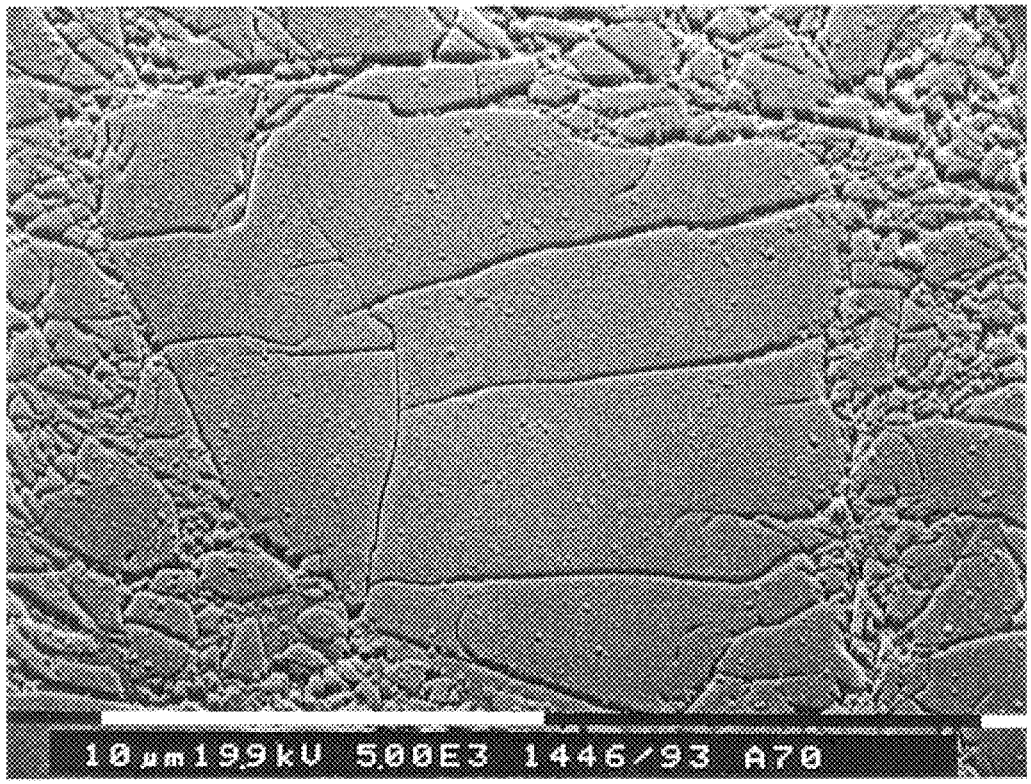
Figure 9:
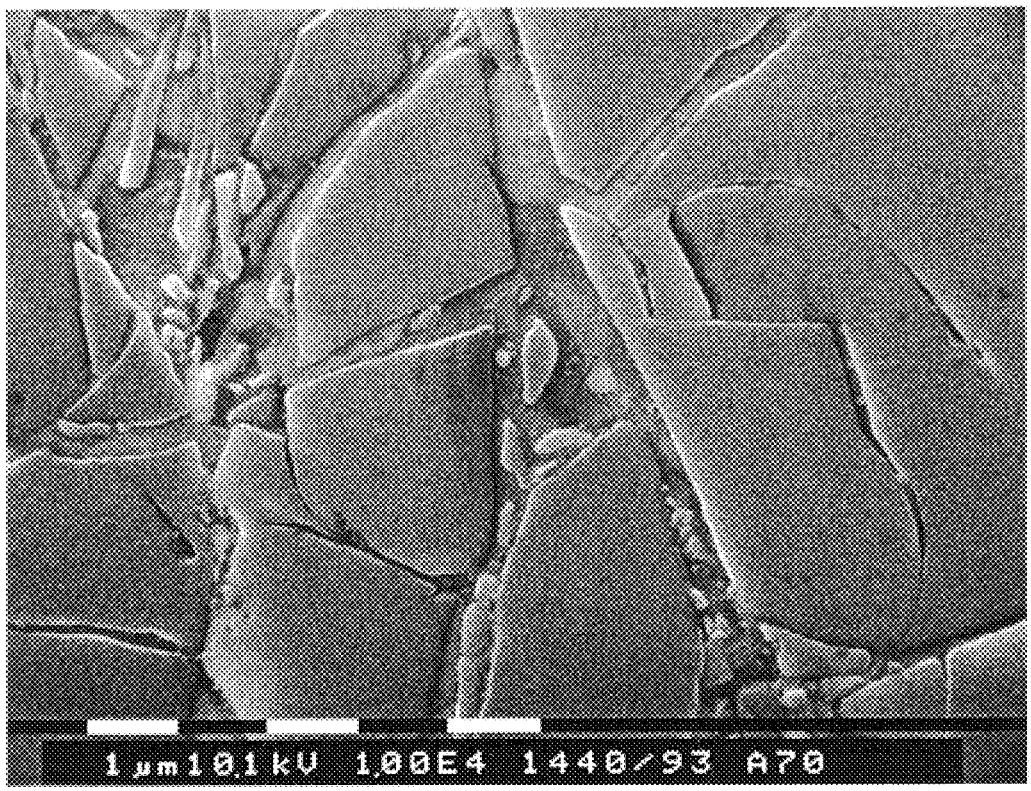
Figure 10:
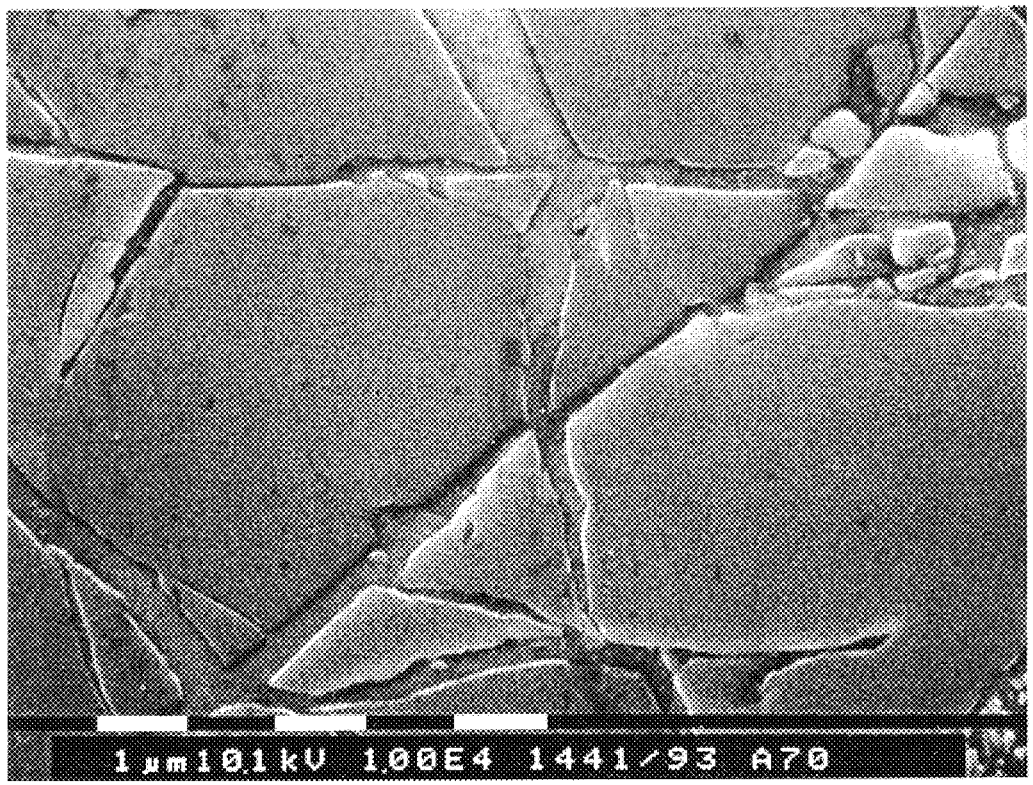

Hardness measurement: Vickers hardness a. micro-indentation: 10–30 GPa b. macro-indentation: 12.5±1.6 GPa After the rod obtained had been sawn through, a part thereof was lapped via a special program for $B_4C$ (Beuhler Dialog method No. 10.10). This yielded a very flat preparation that was suitable for microscopic examination. FIGS. 7 and 8 show multiply broken particles (20–30 $\mu$m) with much grit (<1 $\mu$m). All particles appear to be surrounded entirely by the infiltrated aluminum and the pores are filled up (as are spiral cracks still present) as can be seen in FIGS. 9 and 10. The aluminum binds the particles mutually.

Figure 11:
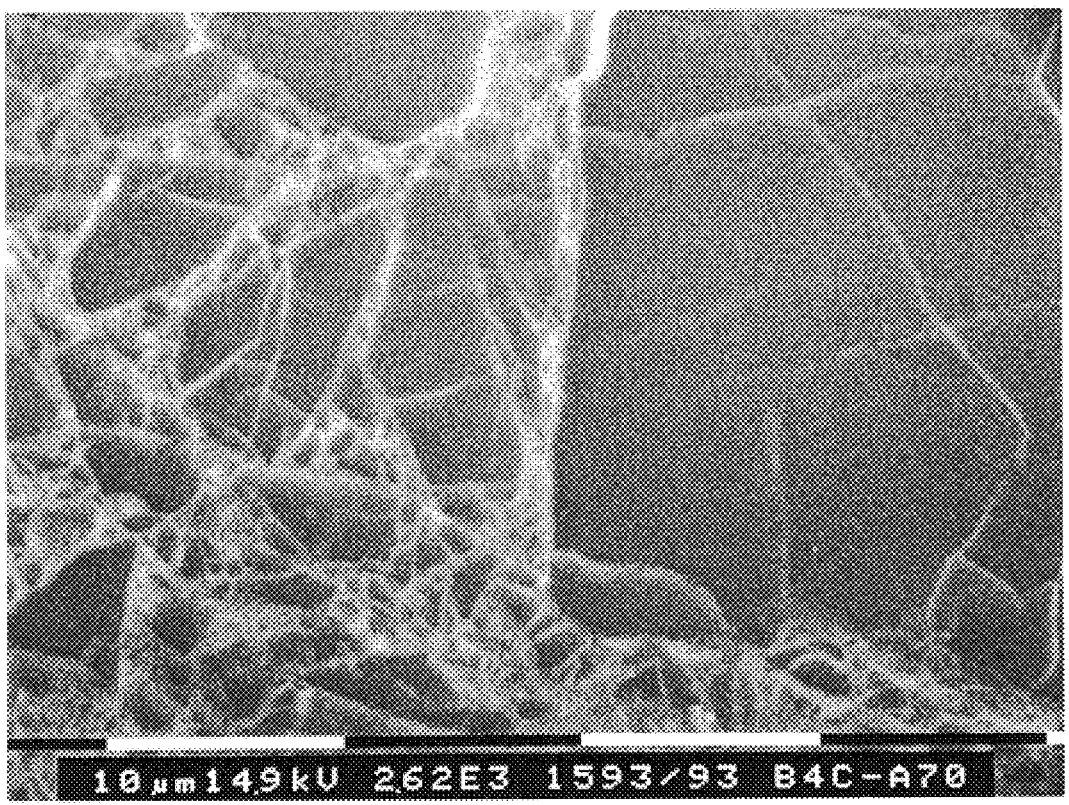
Figure 12:
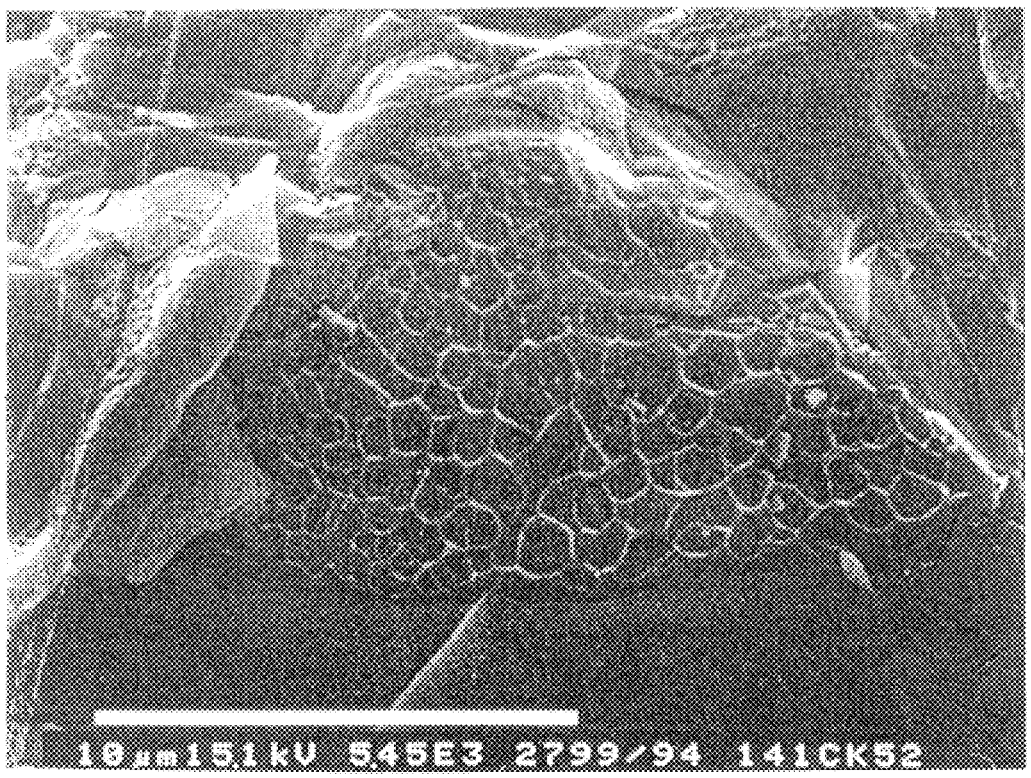

The elements of the material were determined by measurement of the energy of X-rays released through the bombardment with electrons (Energy Dispersing of X-rays, EDX). This can be carried out roughly for the entire surface of an apparatus, as well as very locally (Electron Probe Micro Analysis, EPMA) on a surface of 1 $\mu m^2$. This last yielded only aluminum for the element between the fragments. X-ray diffraction photographs showed that probably on the interfaces between the aluminum and the boron carbide, $Al_4BC$ and/or $AlB_2$ were formed. Since aluminum has a much greater atomic mass than boron (B) and carbon (C), the contrast is large in the imaging of "back scattered" electrons (BEI). This is well visible in FIG. 11.

EXAMPLE 2

Formation of a tube of aluminum-infiltrated titanium diboride.

Three titanium diboride starting powders of different particle sizes (<10 $\mu$m, 10–45 $\mu$m and >45 $\mu$m) were mixed using a turbulator.

The trimodal mixture thus obtained was introduced into a stainless steel (RVS) tube by alternate tapping (using a stamp volumeter) and pressing, in such a manner that the powder mixture obtained a density of 60% TMD. In the middle of the RVS tube, a metal core had been priory arranged, which determines the inside diameter of the tube to be produced. By using an aluminum core ($T_m$=660° C.), it was ensured that the infiltration would proceed from the core. The powder was confined in the tube by means of metal plugs on opposite sides (at the top an aluminum plug, at the bottom an iron and nickel plug). The RVS tube was placed in the middle of a larger plastic tube. The residual space was filled up with an explosive. By detonating the explosive the tube was subjected to a volume contraction and the powder was densified. As a result of the detonation, the density of the powder had increased to 81% of the titanium diboride density.

After the dynamic densification, the tube was placed in an electric furnace, whose atmosphere could be controlled and whose temperature followed a pre-set program. Under argon shield gas, the furnace was heated to 525° C. in 1 hour and maintained at this temperature for two hours. Thereafter the temperature was further raised to 925° C. in 1 hour. The furnace remained at this temperature for ten hours, whereafter the furnace was switched off. As a result, the furnace and the tube cooled slowly. In the first temperature step, the stresses that had arisen in the material as a result of a densification process were annealed. In the second temperature step, the aluminum melted and infiltrated the shocked titanium diboride by capillary attraction. During the cooling of the furnace the aluminum solidified and bound the titanium diboride granules, so that a cermet (aluminum-infiltrated titanium diboride) was formed.

Measurement of the breaking strength: 525±51 MPa

Hardness 7.2±0.2 GPa.

EXAMPLE 3

Formation of a rod of aluminum-infiltrated boron carbide.

Three boron carbide starting powders of different particle sizes (<5 $\mu$m, 16–49 $\mu$m and 106–150 $\mu$m) were mixed using a turbulator. The trimodal mixture thus obtained was introduced into an aluminum tube by alternate tapping (using a stamp volumeter) and pressing, in such a manner that the powder thereby obtained a density of 70% of the boron carbide density.

The powder was confined in the tube by means of metal plugs on opposite sides (at the top an aluminum plug, at the bottom an iron and nickel plug). The aluminum tube was placed in the middle of a larger plastic tube. The residual space was filled up with an explosive. By detonating the explosive, the tube underwent a volume contraction and the powder was densified. The density of the powder thereby increased to 83% of the boron carbide density.

After the dynamic densification, the tube was placed in an electric furnace whose atmosphere could be controlled and whose temperature followed an adjustable course. Under argon shield gas, the furnace was heated to 925° C. in 1 hour and maintained at this temperature for 10 hours. Thereafter the furnace was switched off. As a result, the furnace and the tube cooled slowly.

At a temperature of 925° C. the aluminum was melted and infiltrated the shocked boron carbide through the capillary attraction. During the cooling of the furnace, the aluminum solidified and bound the boron carbide granules, so that a cermet (aluminum-infiltrated boron carbide) was formed.

Measurement of the breaking strength (there are still spiral cracks in the preparation):

317±81 MPa

EXAMPLE 4

Formation of a tube of aluminum-infiltrated boron carbide.

Three boron carbide starting powders of different particle sizes (<5 $\mu$m, 16–49 $\mu$m and 106–150 $\mu$m) were mixed using a turbulator.

The trimodal mixture thus obtained was introduced into an RVS tube by alternate tapping (using a stamp volumeter) and pressing. As a result, the powder mixture obtained a density of 69% of the density of boron carbide. In the middle of the aluminum tube, an aluminum core was priory arranged. The diameter of this core determined the inside diameter of the tube to be produced. The powder in the tube was confined by means of metal plugs on opposite sides (at the top an aluminum plug, at the bottom an iron and a nickel plug). The RVS tube was placed in the middle of a larger plastic tube. The residual space was filled up with an explosive. By detonating the explosive, the tube underwent a volume contraction and the powder was densified. The density of the powder thereby increased to 81% of the density of boron carbide.

After the dynamic densification, the tube was placed in an electric furnace whose atmosphere could be controlled and whose temperature followed an adjustable program. Under argon shield gas, the furnace was heated to 925° C. in 1 hour and maintained at this temperature for 12 hours. Thereafter the furnace was switched off, so that the furnace and the tube cooled slowly. At a temperature of 925° C. the aluminum (tube and core) was present as liquid and infiltrated the shocked boron carbide through the capillary attraction. During the cooling of the furnace, the aluminum solidified and bound the boron carbide granules, so that a cermet (aluminum-infiltrated boron carbide) was formed.

The composites obtained in this manner exhibit a fine-mesh network of narrow channels of an average pore diameter of some hundreds of nanometers, as has been measured using mercury porosimetry, as shown in FIG. 19.

The invention is not in any way limited to the embodiments given in the description, the drawings and the examples. Many variations are possible. Thus, a variety of other ceramic materials and non-ceramic materials can be used, alone or in combination, and a wide variety of materials can be used for infiltration, and a suitable infiltration technique can be chosen, as desired. The dynamic densification can be initiated not only by explosion but also, for instance, by striking means, gas guns, sound and other energy sources. Moreover, a suitable pre-densification method can be chosen, as desired. With a method according to the invention, all kinds of products can be gathered, both finished products and semi-finished products, such as sheet, bar and section material. These and many other modifications are understood to fall within the scope of the invention.

What is claimed is:

1. A composite material having a microstructure of ceramic material having brittle fracture surfaces separated from each other by narrow channels, jointly forming a fine-mesh network of narrow channels, which channels are filled with a second material, which forms a continuous matrix, wherein the microstructure comprises substantially no closed porosity.

2. A composite material according to claim 1, wherein the channels have an average diameter ranging from 100 to 1000 nm.

3. A composite material according to claim 2, comprising between 95 and 50 vol. % of the ceramic material, based on the volume of the composite material.

4. The composite material according to claim 3, comprising between 90 and 70 vol. % of the ceramic material.

5. A composite material according to claim 1, wherein the microstructure of the ceramic material is obtained by shock-wave compaction.

6. An article manufactured from a composite material according to claim 1.

* * * * *